Dec. 30, 1952 W. H. HOWE 2,623,392
MECHANISM FOR ELIMINATING ANGULARITY EFFECT
Filed Sept. 28, 1948 4 Sheets-Sheet 1

INVENTOR
Wilfred H. Howe
BY
Blair, Curtis + Hayward
ATTORNEYS

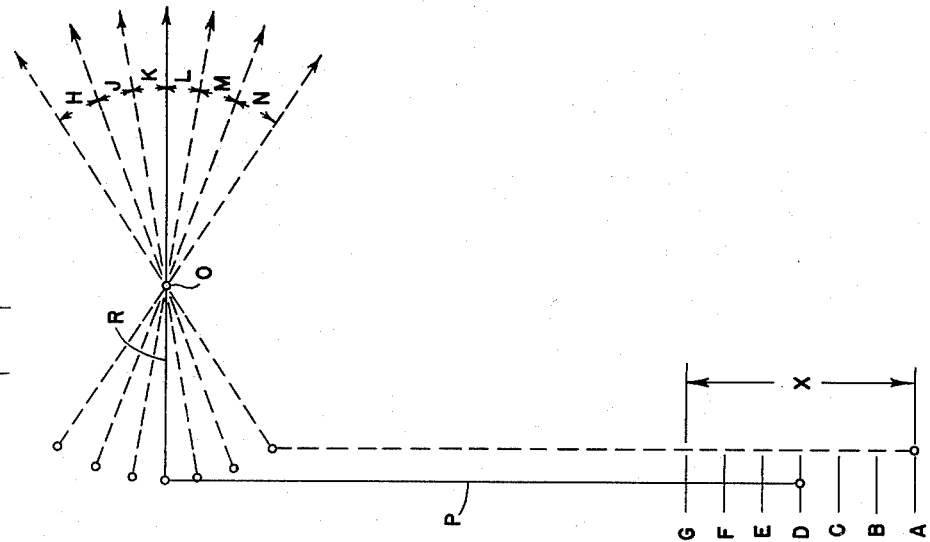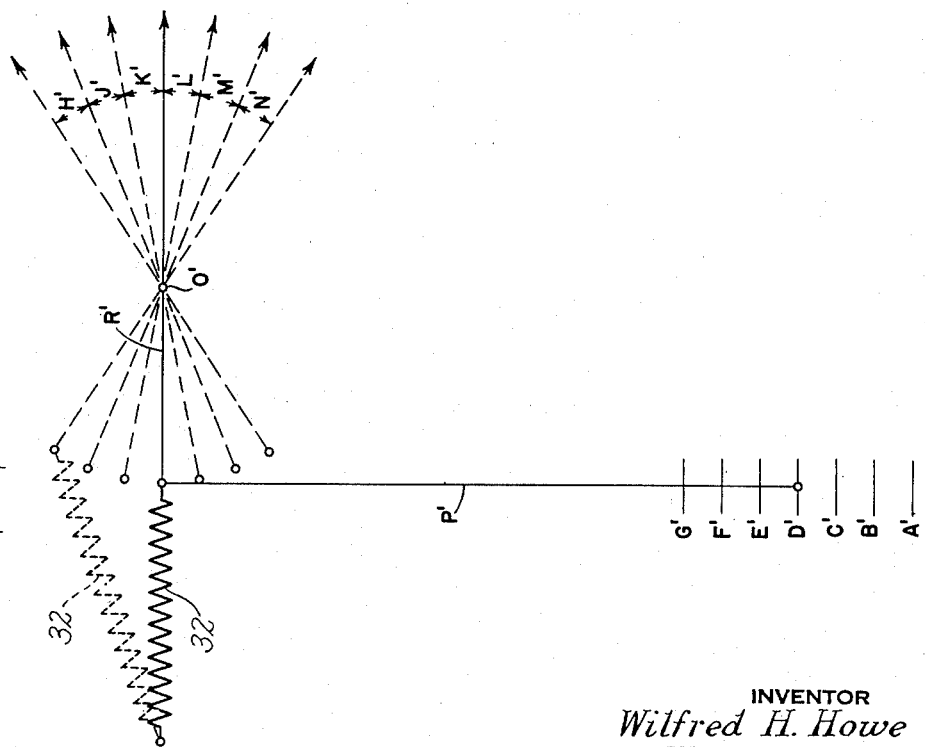

Dec. 30, 1952 W. H. HOWE 2,623,392
MECHANISM FOR ELIMINATING ANGULARITY EFFECT
Filed Sept. 28, 1948 4 Sheets-Sheet 3

INVENTOR
Wilfred H. Howe
BY
Blair, Curtis + Hayward
ATTORNEYS

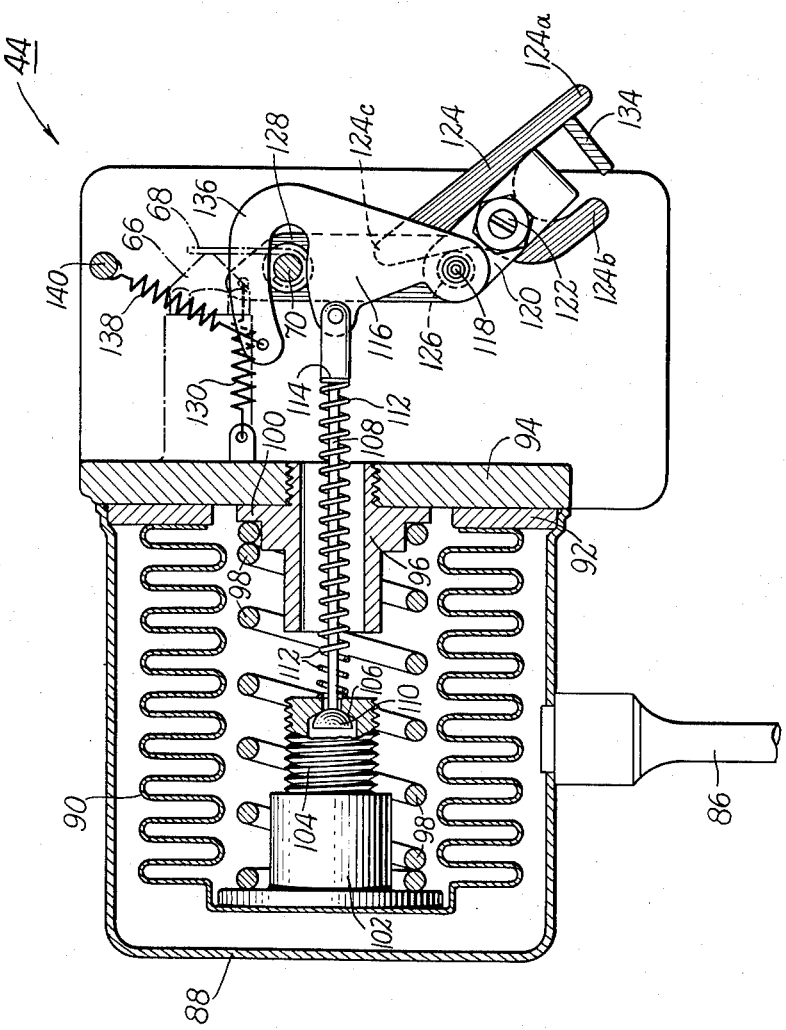

Patented Dec. 30, 1952

2,623,392

UNITED STATES PATENT OFFICE 2,623,392

MECHANISM FOR ELIMINATING ANGULARITY EFFECT

Wilfred H. Howe, Sharon, Mass., assignor to The Foxboro Company, Foxboro, Mass., a corporation of Massachusetts Application September 28, 1948, Serial No. 51,601

2 Claims. (Cl. 73—339)

This invention relates to apparatus for producing angular movement proportional to variations in the value of a variable condition and more particularly to apparatus for overcoming the effects of angularity in measuring and control instruments of the type wherein a condition-sensitive device actuates a linearly movable member which is connected to an angularly movable member that may in turn be connected to an indicating arm or control member for indicating or controlling the value of the condition. The term "linearly movable" as used herein to describe a member having substantially straight-line motion, that is to say, "linear" is used in its physical rather than in its mathematical sense. In the present application the invention is illustratively shown and described as incorporated in a differential pressure responsive device and also in a conventional pneumatic pressure transmitter and receiver. However, as the description proceeds it will be apparent to those skilled in the art that the invention may also be applied to numerous other types of measuring and control instruments.

The problem to which the present invention is addressed can be conveniently described and understood by reference to Figures 1, 2 and 4 of the accompanying drawings. Figure 1 is a fragmentary showing of a differential pressure responsive device which includes a float chamber 10 containing the usual float 12 which is supported on a pool of mercury 15. The chamber 10 is connected in the usual manner to a pipe (not shown) in which there is a fluid flow to be measured and which contains an orifice to establish a pressure-difference related to the fluid flow. The level of mercury 15 varies as a function of fluid flow in the pipe and can be used in known manner as a measure of the flow.

The float 12 is provided with a post 14 that is pivotally connected at point 16 to a lever 18 fixed to the shaft 20 in such manner that shaft 20 is rotated by vertical movement of float 12. The shaft 20 passes through the wall of chamber 10 and at its outer end is provided with a lever 22 connected by a link 24 to a lever 26 on a shaft 28. Fixed to the shaft 28 there is an indicating arm 30 that cooperates with a reference scale (not shown) in the usual manner to indicate the value of the flow.

One of the difficulties encountered in differential pressure responsive devices of the type described arises out of the fact that angular movements of the shaft 20 are not strictly proportional to linear movements of the float 12 because of an effect commonly called the "angularity effect," which is illustrated diagrammatically in Figure 2. Referring to Figure 2 the letter X designates the range of movement of the mercury level and the letters A to G represent equally spaced levels within the range X. P designates a link, representing, for example, that float 12 and its associated post 14, connecting the mercury level and one end of a lever R pivoted at O, and representing the lever 18.

The length of link P is such that when the liquid level is at its mid-position B, the link P and lever R form a right angle. It is evident that as the liquid level moves from position A successively to positions B, C, D, E, F and G, the lever R will be rotated successively through the angles H, J, K, L, M and N. It is further evident that as this movement occurs the angular relationship between link P and lever R changes, and hence the angles H, J, K, L, M and N will not all be equal to one another. For example, although the distance AB equals the distance CD, the angle H is larger than the angle K.

It is further apparent from a consideration of the diagram of Figure 2 that the linear movement of link P is proportional to the sine of the angle $\theta$ through which the lever R is rotated from its midposition. Thus the angularity error is equal to $\theta - \sin \theta$, i. e. the difference between the angle $\theta$, expressed in radians, and the sine of that angle. It can be shown mathematically that the percentage error due to angularity is proportional to the square of the angle $\theta$. Hence the error due to angularity increases very rapidly with an increase in the total angle of movement of lever R, and the need for eliminating the angularity effect becomes correspondingly greater as the total angle of movement is increased.

The result of this angularity effect upon the accuracy of measurement in an instrument wherein the lever R moves through a total angle of 45° and the length of lever R is so selected that its rate of movement is correct at the mid-point of the range, is shown in curve U of Figure 4. In Figure 4 the per cent error in measurement is plotted against the height of the mercury level and it is evident that, for the case assumed, the error varies from −1.3% to +1.3%. This maximum error can be reduced by so adjusting the length of the lever R that the meter reads correctly not only at the mid-point but also at the ends of its range. The nature of the correction applied by changing the length of lever R in this way is indicated by the dotted line W of Figure 4 and such a correction gives the relationship between per cent error and mercury level shown by curve V. This type of correction has been applied heretofore in conventional flowmeters but it is evident that such a correction is not completely satisfactory since there are still substantial errors at points B, C, E and F as well as at other intermediate values of the mercury level.

It is accordingly an object of the present invention to provide an improved structure for eliminating the angularity error from measuring apparatus such as that described herein. It is another object of the invention to provide, in apparatus for producing angular movement of a rotatable member by means of the linear movement of a condition-responsive device, mechanism which eliminates the angularity effect by applying a correction substantially proportional to the square of the angle through which the rotatable member is moved. It is still another object of the invention to provide an angularity correcting mechanism of this type that is particularly useful where the rotatable member is rotated through a relatively large total angle. It is a still further object of the invention to provide an unusually simple and effective mechanism for accomplishing the foregoing objects. Other objects of the invention will be in part obvious and in part pointed out hereafter.

The many objects and advantages of the present invention may best be appreciated by reference to the accompanying drawings which illustrate two types of apparatus incorporating a preferred embodiment of the present invention; and wherein:

Figure 1, as previously indicated, is a fragmentary view of a differential pressure responsive device and shows a compensating spring connected to the float mechanism in accordance with the present invention to overcome the angularity effect described above;

Figure 2, as previously indicated, is a diagram indicating the manner in which angularity effect is produced;

Figure 3 is a diagram similar to Figure 2 illustrating the effect of using a compensating spring in accordance with the present invention;

Figure 7 is a central horizontal section taken through the pressure transmitter of Figure 5 and showing the internal construction thereof.

Figure 1:
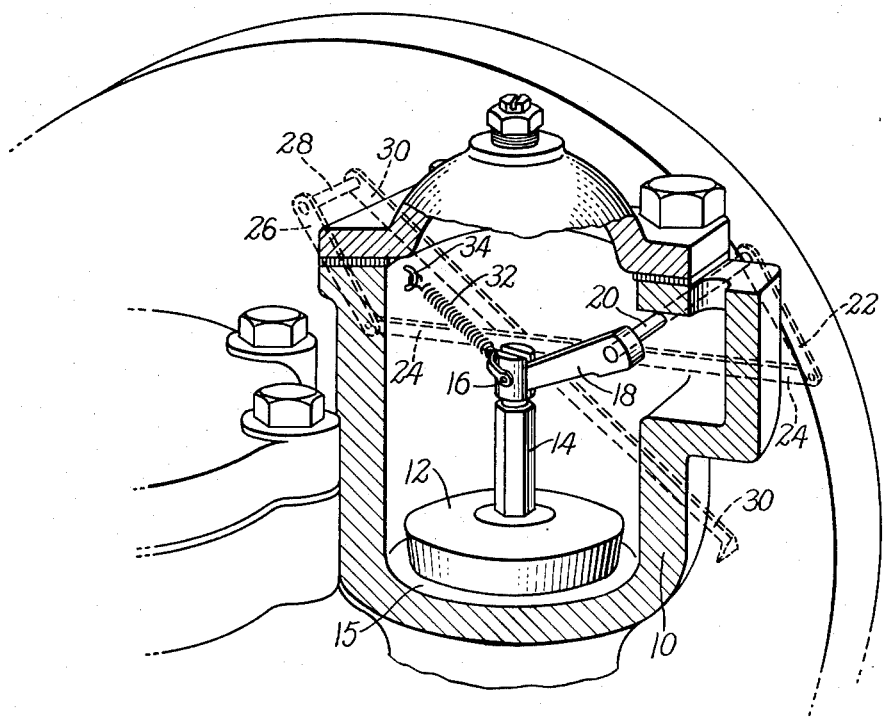
Figure 4:
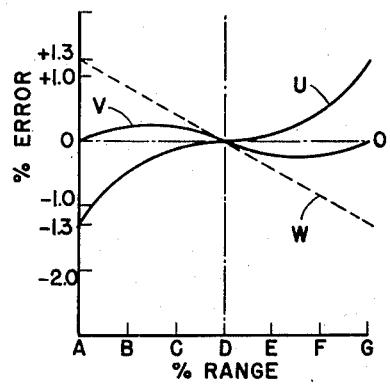
Figure 4 is a graph which, as described above, illustrates the manner in which the angularity error varies as a function of change in mercury level for two different conventional flowmeters.
Figure 5:
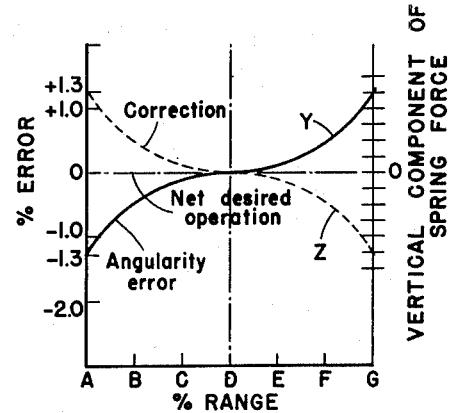
Figure 5 is a diagram similar to that of Figure 4 and illustrating the type of correction applied by the device of the present invention.

Referring first to Figure 5 of the drawings, curve Y is the same as curve U of Figure 4 and the dotted curve Z shows the nature of the correction that must be applied to a float and linkage mechanism of the type shown in Figure 1 in order to eliminate the angularity error and produce a net desired operation as represented by the horizontal line O—O of Figure 4. The dotted correction curve is plotted against a scale at the right of Figure 5 which represents the vertical force which should be applied to the float to eliminate the angularity error. No units are given since the magnitude of the force varies with factors such as float size, etc.

I have found that this desired correction may be simply and effectively achieved by utilizing as a compensating device a coil spring which may, for example, in the embodiment of Figure 1, be effectively connected to the float 12. Reverting to Figure 1, the spring 32 is connected at one end to the pivot point 16 interconnecting the post 14 and lever 18 and at its other end is connected to the casing 10 at the point 34. The fixed end of the spring 32 is so located that when the mercury level is at the mid-point of its range of movement, the point 34, the point 16 and the axis of shaft 20 are aligned with one another. It is evident that when the level of the mercury is below its mid-point, the spring 32 operates to exert an upward force on the float 12 thereby causing it to float somewhat higher in the pool of mercury 15 than it otherwise would. Similarly when the mercury level is above its mid-position, the spring 32 exerts a downward force on float 12 causing it to float somewhat lower in the pool of mercury than it otherwise would. I have found that by proper selection of the spring characteristic of spring 32, this spring will operate to compensate accurately for the angularity error otherwise produced by the float and its associated mechanism.

The action of the compensating spring 32 may be conveniently explained in connection with Figure 3 of the drawings. Referring to Figure 3, the diagram shown in this figure is similar to that shown in Figure 2 but includes a spring 32 connected to the point of interconnection of link P' and lever R'. As the mercury level moves from A' successively to B', C', D', E', F' and G', the lever R' is rotated through the angles H', J', K', L', M' and N' respectively, which correspond with the angles H to N of Figure 2. However, the action of the spring 32 is such that the angles H' to N' are all equal to one another. In other words, spring 32 modifies the action of link P' on lever R' in such manner that the angular movements of lever R' are at all times proportional to the substantially linear movement of link P'.

The manner in which the spring 32 achieves this objective may be explained by considering the action of the spring as lever R is rotated in a clockwise direction. It is evident that as lever R is rotated the spring tends, by what might be called a toggle action, to reduce the rotational movement of lever R'. This toggle action is made up of two effects. In the first place the angle between spring 32 and lever R' changes as R' rotates and hence the downward component of the force exerted by the spring on the lever increases. In the second place the spring is stretched as the lever rotates and hence the magnitude of the total force exerted by the spring increases. It can be mathematically shown that each of these two effects is approximately proportional to the angle $\theta$ through which the lever R' rotates and therefore the composite effect of the spring is a correcting influence substantially proportional to the square of the angle $\theta$. It has been pointed out above that this is precisely the correction required to eliminate angularity effect.

The characteristics of the spring used, such as its size and stiffness, depend upon the characteristics of the meter in which it is incorporated. In selecting a proper spring it is usually desirable to determine first the relationship between the force required to deflect the float 12 a given amount and the deflection produced by that force. When this relationship has been determined and the lengths of link P and lever R are known, the desired spring stiffness and length may be readily calculated.

Figure 6:
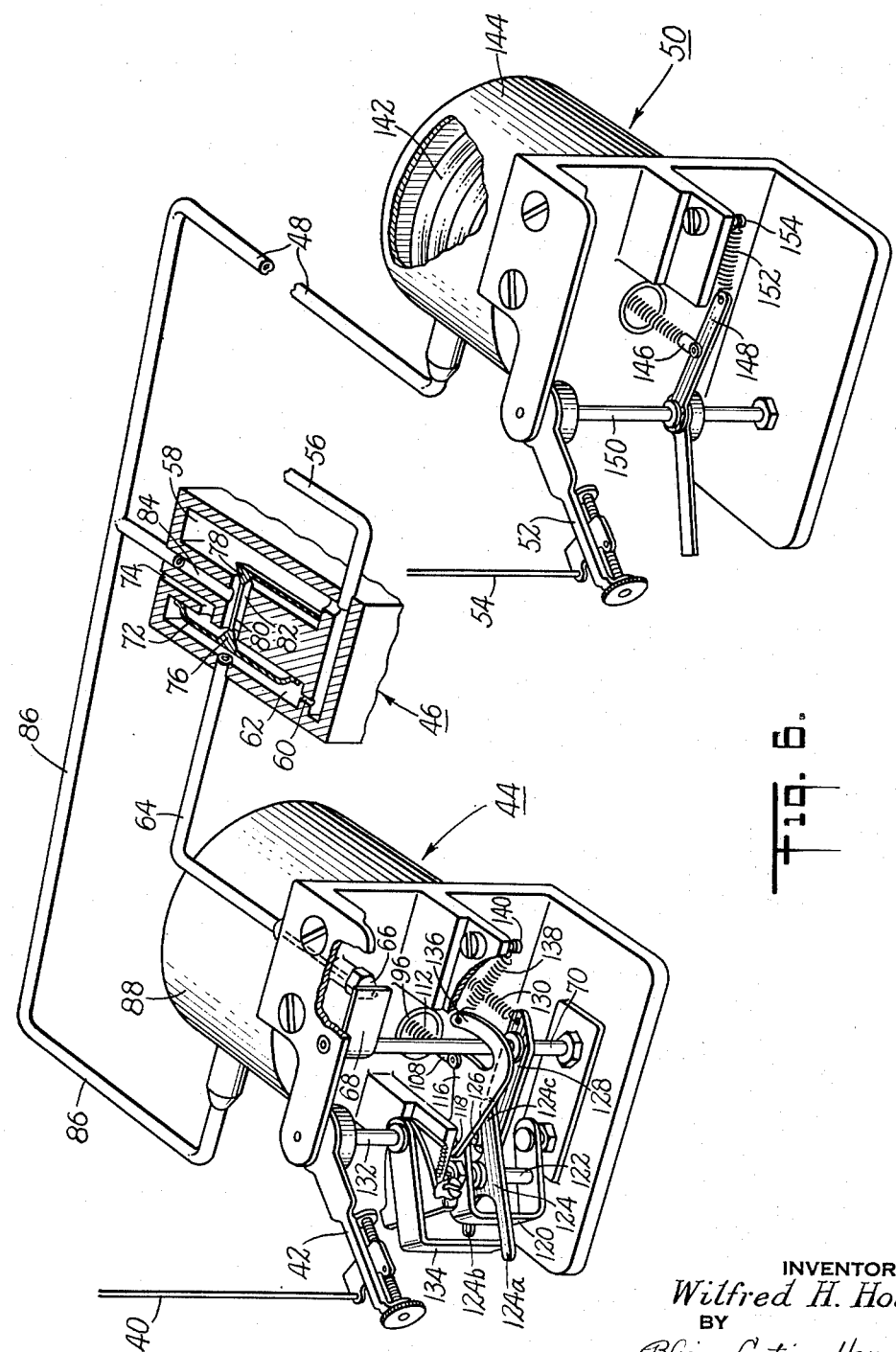
Figure 6 is a perspective view of a pneumatic-pressure transmitter and receiver incorporating the present invention.

Figures 6 and 7 show the application of the present compensating device to a pneumatic-pressure transmission system of the type wherein the value of a variable condition e. g. temperature, is converted into a pneumatic pressure which is transmitted to a remote point to position an indicating arm or control member in accordance with the temperature value. Referring to Figure 6 and considering first the general mode of operation of the system there shown, the pressure transmitter, generally designated 44, includes an angularly movable lever arm 42 that is connected through a link 40 to a conventional temperature-responsive device (not shown) in such manner that the arm 42 is angularly positioned in accordance with the value of the temperature. The angular position of arm 42 is converted by transmitter 44 and an associated relay valve 46 into a proportional pneumatic pressure which is transmitted through a pipe 48 to a receiver 50. The receiver 50 converts the received pneumatic pressure into angular movement of an arm 52 which is connected by a link 54 to a suitable indicating arm or control member (not shown).

The angular position of arm 42 is converted into a proportional pneumatic pressure as follows. Air under pressure from a suitable source is supplied through pipe 56 to relay valve 46 and more particularly to a high pressure chamber 58 thereof and through a restriction 60 to a low pressure chamber 62. From chamber 62 a pipe 64 leads to a nozzle 66 that forms part of the transmitter 44. Air flows continuously from chamber 62 through pipe 64 and nozzle 66, and the flow of air from the nozzle is varied by a baffle 68 mounted on a shaft 70 for rotation therewith. Shaft 70 is actuated by mechanism described below to maintain baffle 68 in operative position with respect to nozzle 66. The range of movement of baffle 68 through which it is operative to vary the flow from nozzle 66 is very small, i. e. of the order of .001 in., and hence only a very small movement of shaft 70 is required to cause the pressure in back of nozzle 66 to change from a maximum to a minimum value and vice versa.

The pressure in back of nozzle 66 bears against one side of a valve-operating diaphragm 72 within the relay 46, and the opposite side of the diaphragm communicates with the atmosphere through a passage 74. Diaphragm 72 actuates a supply-and-waste type valve comprising the valve heads 76 and 78 which are connected by a valve stem 80 that is axially movable in a passage 82. The passage 82 is connected by a passage 84 with the pipe 48. The action of the relay valve 46 is such that as the pressure in chamber 62 builds up, valve 76 closes and valve 78 opens to cause air to flow from high pressure chamber 58 through passages 82 and 84 to pipe 48 to increase the pressure in pipe 48. On the other hand, when pressure in chamber 62 drops, valve 78 closes and valve 76 opens to permit air from pipe 48 to be exhausted through passages 84, 82 and 74, thereby lowering the pressure in pipe 48. A branch pipe 86 interconnects pipe 48 and the interior of casing 88 of transmitter 44.

Referring now to Figure 7, the casing 88 contains a flexible metal bellows 90 which has a closed movable end and at its other end is sealed to a ring 92 fixed to a base 94 having a central hole through which a sleeve 96 is threaded. The bellows 90 is urged toward its distended position by a relatively heavy spring 98 which at one end bears against a shoulder 100 of the sleeve 96, and at its other end bears against the interior of the movable end of the bellows. The space between casing 88 and bellows 90 communicates through pipe 86 with the output pressure of relay 46, and hence the movable end of the bellows is positioned in accordance with this output pressure, which is the same as the transmitted pressure.

The movable end of bellows 90 is provided with boss 102 which receives an externally threaded bushing 104 that has a central hole 106 in one end thereof. Extending through the hole 106 and also through sleeve 96 there is a push-rod 108 which, as shown in Figure 6, is provided with a hemispherical end 110 adapted to bear against the inner surface of bushing 104. The hemisphere 110 is held against the inner surface of bushing 104 by a spring 112 that surrounds the push-rod 108 and is normally in compression. The spring 112 bears at one end against the end of bushing 104 and at its other end against a shoulder 114 of push-rod 108. The construction is such that the hemispherical end 110 is normally held in contact with the interior of bushing 104 by spring 112, but if the push-rod 108 encounters substantial resistance the spring 112 is compressed to permit relative movement of the push-rod and bellows. The hemispherical end 110 facilitates the small amount of lateral movement of push-rod 108 that is required by its mode of connection to the parts now to be described.

The push-rod 108 at its outer end is connected to a lever 116 rotatable about an axis designated as 118. Reverting to Figure 6 or 7, rotatable about the same axis as lever 116 and fixed to the lever 116 there is a U-shaped arbor 120 in which a small shaft 122 is rotatably supported. Fixed to the shaft 122 there is a branched lever 124 having the arms 124a and 124b that partially embrace the arbor 120, and an arm 124c that engages a pin 126 on a lever 128 fixed to the shaft 70 on which the baffle 68 is mounted. The lever 128 is continuously urged by a spring 130 in a counterclockwise direction i. e. a direction to cause pin 126 to bear against arm 124c.

The parts of transmitter 44 and relay 46 so far described operate to maintain the baffle 68 in its operative position with respect to the nozzle 66. If, for example, the baffle 68 starts to move away from nozzle 66, the pressure in pipe 64 and chamber 62 drops, valve 78 closes and valve 76 opens to exhaust air from pipes 48 and 86. The resulting decrease in pressure in casing 88 causes bellows 90 to distend, thereby drawing push-rod 108 into the casing to rotate lever 116 in a counterclockwise direction (as shown in Figure 6). Arbor 120 moves with lever 116 to shift the pivot point of shaft 122 and thereby causes lever 123 to be rotated counterclockwise by spring 130, thus moving baffle 68 toward the nozzle 66 to increase pressure in pipe 64. If, on the other hand, the baffle 68 starts to move too far toward nozzle 66, the reactions described occur in a reverse sense to oppose movement of baffle 68 toward the nozzle. The net effect of the action described is that the relay 46 produces an output pressure that is always of such a value as to maintain the baffle 68 in operative position with respect to nozzle 66.

As previously described, arm 42 is connected by link 40 with a temperature-responsive element and is angularly positioned in accordance with the value of the temperature. Arm 42 is fixed to a shaft 132 which is in turn fixed to an L-shaped lever 134, the lower end of which engages arm 124a of lever 124. The arm 124a is sufficiently longer than the arm 124b to cause lever 134 to engage arm 124a but to pass by arm 124b.

Movements of arm 42 in response to variations in temperature are transmitted through shaft 132, lever 134, lever 124, and lever 128 to the shaft 70 on which baffle 68 is mounted. Thus movement of the parts in response to variations in temperature tends to move baffle 68 with respect to nozzle 66. However, as previously described, as soon as baffle 68 starts to move, a pressure change occurs in pipe 86 that opposes movement of the baffle and maintains the baffle in its operative position with respect to the nozzle. Hence the net effect of movement of arm 42 in response to temperature changes is to produce in pipes 48 and 86 a pressure that is proportional to the temperature.

Reverting to Figure 7, it is apparent that the lever 116 is rotated about axis 118 by the substantially linear movement of push-rod 108, and hence the problem of angularity effect as described above is inherently present in this structure. In accordance with the present invention a compensating device is provided to overcome this angularity error. The lever 116 is provided with an arm 136 that extends around shaft 70 and at its end is connected to a spring 138, the other of which is connected to a fixed post 140. The spring 138 operates in a manner analogous to that previously described in connection with Figure 1 to overcome the effects of angularity. The transmitter is so adjusted that at the midpoint of its effective range, post 140, axis 118, the point of connection of rod 108 to lever 116, and the point of connection of spring 138 to arm 136 are aligned with one another. In this way the spring 138 is caused to produce opposite corrective effects of the proper magnitude depending upon whether the device is operating above or below the mid-point of its range, and hence the angularity error is effectively compensated for.

The pressure in pipe 48, which as indicated above, is proportional to the temperature, is transmitted to the receiver 50 which may be located at a remote point and in construction and operation is generally similar to the transmitter 44. The input pressure to receiver 50 is impressed upon a bellows 142 enclosed within the casing 144 of the receiver and operating a push-rod 146 similar to the push-rod 108. The rod 146 is connected to a lever 148 fixed to a shaft 150 on which the arm 52 is also fixed. Thus as the pressure within casing 144 varies, push-rod 146 is moved by the free end of bellows 142 to rotate lever 148, and hence rotate arm 52 and link 54 to indicate or control the measured temperature.

In order to compensate for angularity effect, a spring 152 is provided at the receiver which is connected at one end to the lever 148 and at its other end to a fixed post 154. Spring 152 operates like the spring 138 and serves to compensate for the angularity effect present in the receiver 50.

From the foregoing description it should be apparent that the present invention provides an unusually simple and effective device for compensating for, and hence effectively overcoming, errors caused by angularity. The present compensating device is particularly useful in apparatus of the type wherein the value of a variable process condition, such as temperature, pressure, liquid level and the like, is measured and indicated, recorded, or controlled, since it may be advantageously incorporated in the lightweight mechanisms used in such instruments. Two illustrative applications of the present compensating device have been described herein, but it will be apparent to those skilled in the art that the device may be applied in many other ways as well without departing from the spirit of the invention. Since many embodiments might be made of the present invention and since many changes might be made in the embodiment disclosed herein, it is to be understood that the foregoing description is to be interpreted as illustrative only and not in a limiting sense.

I claim:

1. In a measuring apparatus of the type wherein changes in the value of a variable condition are converted into proportional angular movements of a rotatable shaft, a condition responsive device proportionally responsive to changes in the value of said condition a linearly movable element, elastically positionable by said responsive device to a series of predetermined positions corresponding with values of said condition, a rotatable shaft mounted at one side of said element, a lever fixed on said shaft for rotation therewith and pivotally connected to said element whereby said shaft is positionable in rotation by movement of said element, operating linkage secured to said rotatable shaft for motion take-off therefrom, and a coil spring with one end fixed at a point on the opposite side of said element from said shaft and the other end connected to said lever, for overcoming the effects of angularity in said apparatus, with said apparatus in such arrangement that at one position of said element, the axis of said shaft at said lever, said pivot connection between said lever and said element, and both of said end connections of said spring define a single, straight line.

2. In a measuring apparatus wherein changes in the value of a variable condition are converted into proportional angular movements of a rotatable shaft, a pneumatic pressure transmission system comprising a bellows-type transmitter, a relay valve, and a bellows-type receiver, said transmitter comprising a bellows unit, an element secured to said bellows unit and linearly movable thereby, a rotatable shaft mounted at one side of said element, a lever fixed on said shaft for rotation therewith and pivotally connected to said element whereby said shaft is positionable in rotation by movement of said element, a coil spring with one end fixed at a point on the opposite side of said element from said shaft and the other end connected to said lever, for overcoming the effects of angularity in said lever, with said apparatus in such arrangement that at one position of said element, the axis of said shaft at said lever, said pivot connection between said lever and said element, and both of said end connections of said spring define a single straight line, a flapper-nozzle arrangement, a motion input to said flapper-nozzle arrangement from means responsive to said variable condition and a motion connection to said flapper-nozzle arrangement from said rotatable shaft, a pneumatic relay pneumatically connected to said flapper-nozzle arrangement and to said transmitter bellows unit, whereby a change in said flapper-nozzle arrangement results in a change in pneumatic pressure in said transmitter bellows, and said receiver comprising another bellows unit with a pneumatic connection to said transmitter bellows unit and said relay whereby the pneumatic pressure in said transmitter bellows is transmitted to said receiver bellows, an element secured to said receiver bellows and linearly movable thereby, a rotatable shaft mounted at one side of said receiver element, a lever fixed on said receiver shaft for rotation therewith and pivotally connected to said receiver element whereby said receiver shaft is positionable in rotation by movement of said receiver element, a coil spring with one end fixed at a point on the opposite side of said receiver element from said shaft and the other end connected to said receiver lever for overcoming the effects of angularity in said receiver lever, with said apparatus in such arrangement that at one position of said receiver element the axis of said receiver shaft at said receiver lever, said pivot connection between said receiver lever and said receiver element, and both of said end connections of said receiver spring define a single straight line.

WILFRED H. HOWE.

REFERENCES CITED

The following references are of record in the file of this patent:

UNITED STATES PATENTS

| Number | Name | Date |
|---|---|---|
| 868,152 | Atkinson | Oct. 15, 1907 |
| 2,199,013 | Sprague et al. | Apr. 30, 1940 |
| 2,268,549 | Kennedy | Jan. 6, 1942 |
| 2,298,168 | Robinson | Oct. 6, 1942 |
| 2,311,853 | Moore | Feb. 23, 1943 |

FOREIGN PATENTS

| Number | Country | Date |
|---|---|---|
| 201,552 | Great Britain | Apr. 24, 1924 |